May 10, 1960  M. J. WILCOX  2,936,062
CONVEYOR DIVERTING MEANS
Filed June 17, 1958  2 Sheets-Sheet 1
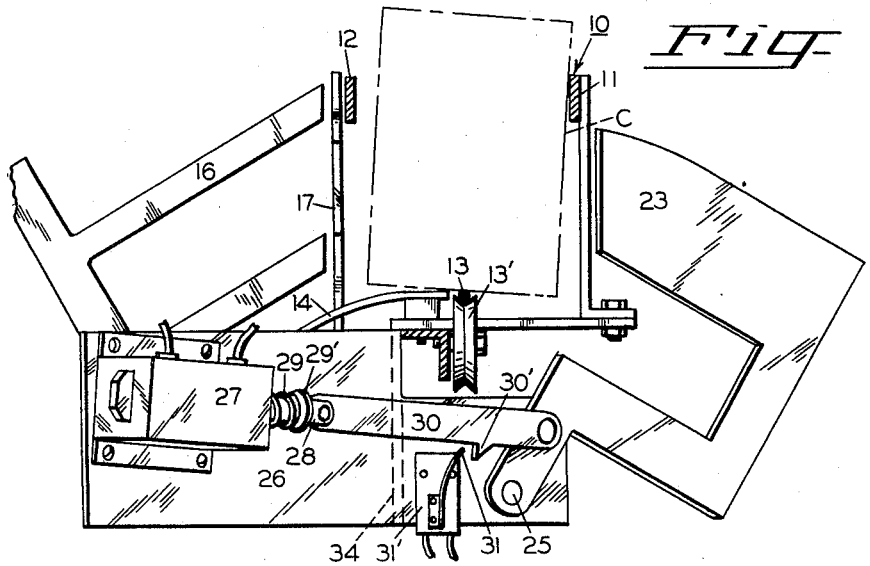
Fig. 2
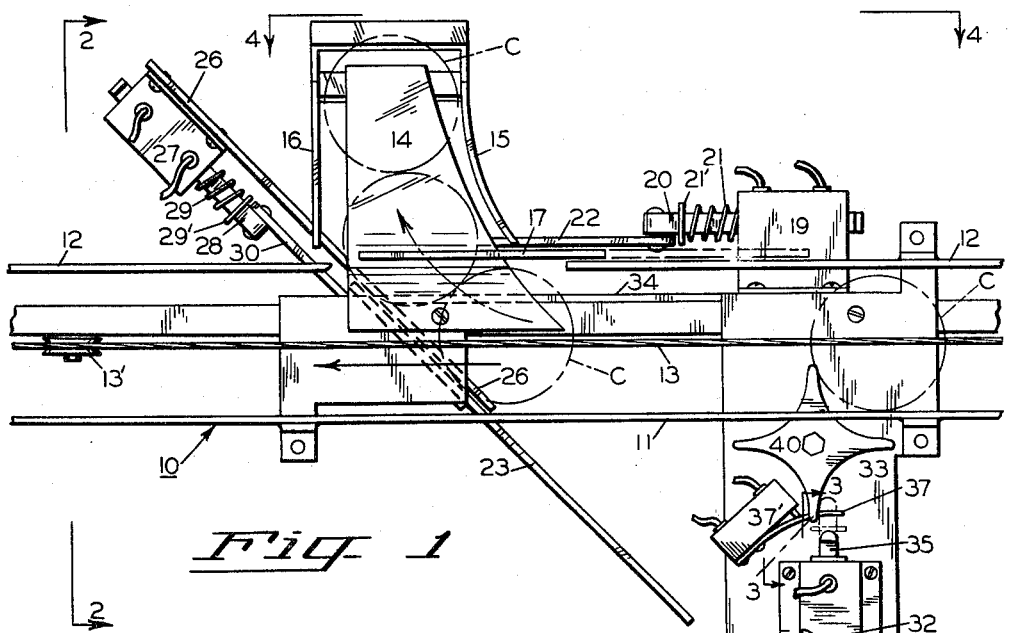
Fig. 1
Fig. 3
INVENTOR.
MARTIN J. WILCOX
BY
T. R. Geisler
ATTORNEY

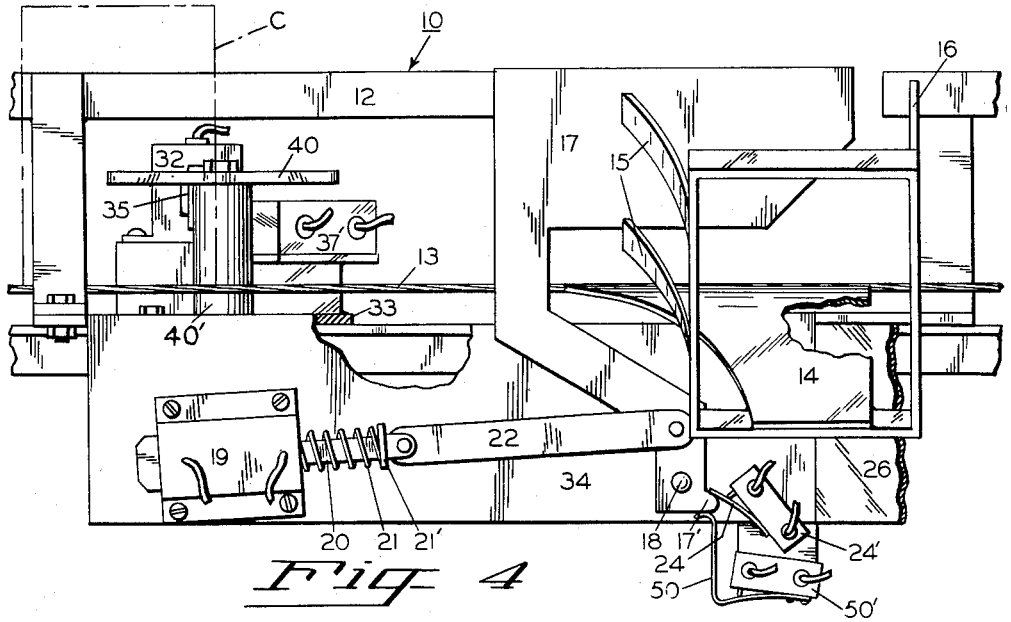
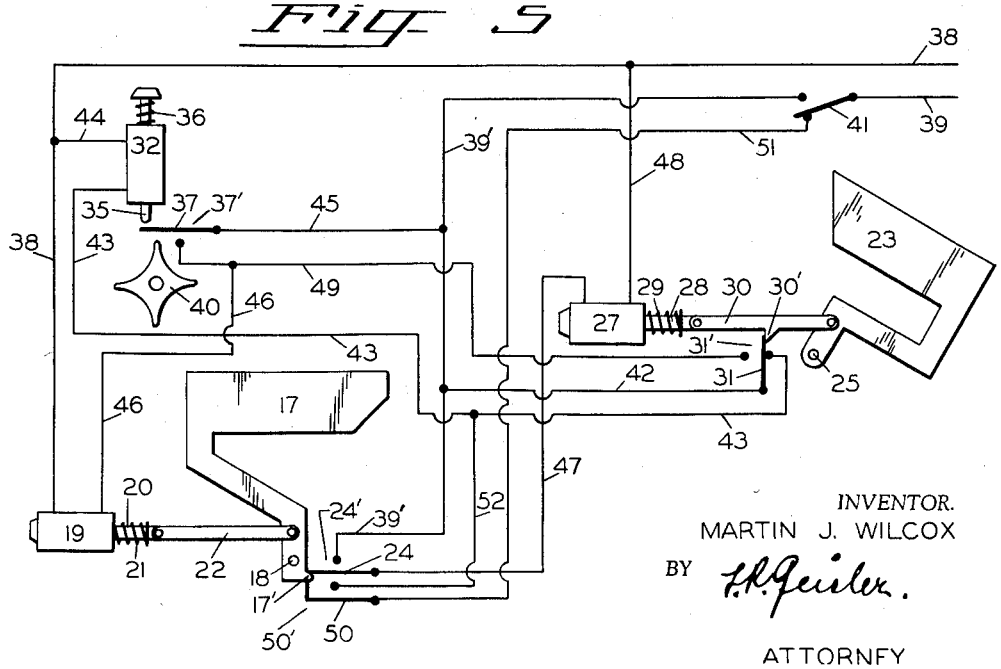

United States Patent Office 2,936,062
Patented May 10, 1960

2,936,062

CONVEYOR DIVERTING MEANS

Martin J. Wilcox, Portland, Oreg.

Application June 17, 1958, Serial No. 742,583

2 Claims. (Cl. 198—188)

This invention relates to the use of conveyor systems for conveying articles to various stations along the conveyor in a factory or plant, and relates in particular to the conveying and distribution of containers, such as tin cans and the like, in a packing plant.

As is customary in packing plants, a conveyor carries the empty containers or cans to a succession of stations or locations and some means is necessary for diverting some of the containers or cans from the conveyor to individual stations as required.

While various types of diverting means have previously been developed and employed, some of which have proved satisfactory for conveyors operating at moderate speed, it has been found that where empty cans, for example, are being delivered in considerable number by a rapidly travelling conveyor, these diverters have not been able to cope satisfactorily with the rapid travel of the cans and consequently, under such conditions, the attempts of the diverters to divert the rapidly moving cans from the conveyor frequently have resulted in the cans becoming blocked or wedged against each other in such manner as to stop all delivery of the cans until the conveyor is slowed down and the blockade removed.

An object of the present invention is to provide improved diverting means which will be entirely fool proof and capable of operating positively under any reasonable conveyor speed.

Another specific object is to provide improved diverting means along the conveyor which, when the containers or cans are to be diverted from the conveyor at any particular station, will momentarily restrain the travel of the containers or cans approaching that station for an instant sufficient to enable the diverting means to become entirely and properly positioned before the diverting means intercepts the first can required to be diverted.

A further and related object of the invention is to provide an improved diverting assembly comprising separate movable elements which will operate positively and in rapid sequence at a properly timed interval in advance of the can or cans to be diverted.

An additional object is to provide such a diverting assembly which will become operable or inoperable merely by actuation of a single simple control, such as a push button switch.

The manner in which these objects and other advantages are attained and the construction and operation of the improved diverting means of the present invention will be understood readily from the following brief description and explanation with reference to the accompanying drawings, in which:

Fig. 1 is a plan view of the diverting means showing the control gates and related members in normal position, when the cans or containers are not to be diverted from the conveyor, but also indicating in broken lines the positions into which these move so as to cause the cans or containers to be diverted.

Fig. 2 is an end elevation taken on line 2—2 of Fig. 1;

Fig. 3 is a fragmentary sectional elevation taken on line 3—3 of Fig. 1 and drawn to a larger scale;

Fig. 4 is a fragmentary side elevation taken on line 4—4 of Fig. 1; and

Fig. 5 is a schematic lay-out and wiring diagram.

Referring first to the plan view in Fig. 1, a portion of the conveyor assembly along which the cans are being moved (from right to left as viewed in this figure) and from which from time to time cans are to be diverted, is indicated in general by the reference 10 and includes side guide rails 11 and 12 on opposite sides of the conveyor, spaced apart a distance a little greater than the diameter of the cans C or other containers being delivered by the conveyor, and an endless cable or belt 13 on which the cans rest as they are moved along in the conveyor, the travelling cable 13 being supported on pulleys 13' in the customary manner, these pulleys being mounted in the base frame structure of the conveyor assembly.

At the location where some cans will be required to be diverted from the conveyor a slide 14 is mounted which leads downwardly to one side from the approximate level of the cable 13, and side rails 15 and 16 guide the cans on this slide or chute when they are caused to leave the conveyor. The top entrance onto this slide or chute is controlled by a gate 17, which, when in normal position, shown in full lines in Fig. 1, closes off the slide so as to prevent any cans from inadvertently passing down the slide when cans are not desired at this location.

A second gate 23, positioned on the opposite side of the conveyor (see also Fig. 2), when in the normal open position (this position also being shown in full lines in Fig. 1), is so arranged that it can extend obliquely across the conveyor (in the broken line position shown in Fig. 1) so as to cause cans which come into contact with this gate, when the gate is in such closed position, to be diverted down the slide or chute 14, the gate 17 at such time having moved to open position.

A rotatable star wheel 40, also shown in Fig. 1, extends part way into the path of the conveyor so that all cans passing the location of this star wheel 40 will cause partial rotation of the wheel, but also so that cans will be prevented from passing beyond this point during any moments in which the star wheel is held against rotation.

Briefly, the device as thus far described and as shown in Fig. 1 operates as follows: Under normal conditions, when no cans are to be diverted onto the slide 14, the gate 17 is maintained in closed position, the gate 23 is maintained in open position, and the star wheel 40 rotates freely. However, when it is desired to divert cans onto the slide 14, the star wheel 40 is momentarily held against rotation while gate 17 opens and gate 23 closes. Thereupon the star wheel 40 again immediately becomes free to rotate and all cans then passing the star wheel will be diverted to the slide 14 until such time as the gates 23 and 17 are returned to their normal positions. The manner in which these various members are caused to function in the sequence mentioned, immediately following the manipulation of a control switch, will now be described in detail.

Referring to Fig. 4, the gate 17, which is shown in the normal closed position, thus closing off the entrance to the slide 14, is pivotally mounted at 18 on a supporting plate 34 which is attached to the conveyor frame. A solenoid 19 has a core member 20 which is connected with the gate 17 by the link 22. A spring 21, mounted on the core 20 and held under compression at all times between the solenoid housing and a collar 21' secured on the core member, normally maintains this gate 17 in the normal or closed position shown in Fig. 4, but the energizing of the solenoid 19 causes the core member 20 to move to the left (as viewed in Fig. 4) against the force of the spring 21 and thus results in the gate 17 being swung to open position and maintained in open position as long as the solenoid continues to be energized, thereupon allowing passage of the cans onto the slide 14. The gate 17 has a lower projecting lug 17' which contacts a flat spring 24 mounted on a switch assembly 24'. This arrangement is such that the movement of the gate 17 into open position results in the spring 24 being pushed into position to close the contacts in the switch assembly 24'. The lug 17' also engages a spring arm 50 of a switch assembly 50' which is so arranged that when the gate 17 opens the switch assembly 50' will also be closed. The reasons for these arrangements will be explained later.

Referring now to Fig. 2, the gate 23 is pivotally mounted at 25 on a mounting plate 26 attached also to the supporting frame of the conveyor. A solenoid 27, mounted on the supporting plate 26, has a core member 28 (see also Fig. 1) which is connected with the gate 23 by the link 30. A spring 29 on the core member 28 is held under compression between the solenoid housing and a collar 29' on the core, and, except when the solenoid is energized, this spring maintains the gate 23 in the open position illustrated, but enables the gate 23 to be closed against the force of the spring 29 when the solenoid 27 is energized and to remain closed as long as the solenoid 27 continues to be energized. The link 30 carries an engaging lug 30' which engages a spring element 31 on a switch assembly 31'. This arrangement is such that the movement of the gate 23 to closed position will operate the switch 31' in such manner as to interrupt one circuit while closing another circuit in a manner and for a reason to be explained presently.

A third solenoid 32 (Fig. 1) is mounted on a base plate 33 attached to the supporting frame for the conveyor, and the rotatable star wheel 40 is also mounted on this same base plate 33. The solenoid 32 has a core 35 which is normally held in retracted position by a coil spring 36. The energizing of the solenoid 32 causes the core 35 to move out into the broken line position, as indicated in Fig. 1, against the force of spring 36, whereupon the core 35 engages the star wheel 40 and prevents rotation of the star wheel while this engagement continues, and at the same time the core 35 also engages a flat spring 37 of a switch assembly 37' so as to close the switch. The holding of the star wheel 40 against rotation prevents a can on the conveyor from passing beyond the star wheel until the star wheel is again free to rotate.

The manner and control sequence in which the solenoids 19, 27, and 32 for the gate 17, the gate 23 and the star wheel 40 are made operable will now be explained with particular reference to the wiring diagram in Fig. 5. The two main conductors 38 and 39 are connected to a suitable source of electric energy. A two way control switch 41, is located convenient to the operator at the station which is being supplied with cans received from the chute or slide 14, this control switch being shown connected on the main conductor line 39.

A conductor 42 is connected to conductor 39' and, through switch element 31 when in normal position, is connected to conductor 43 and thence to solenoid 32. Solenoid 32 is also connected with the main conductor 38 by the branch conductor 44. Thus the closing of the control switch 41, with the switch element 31 in normal position, closes the circuit to solenoid 32.

Actuation of solenoid 32 and the movement of the core 35, as previously explained, momentarily blocks star wheel 40 against rotation while moving the spring switch element 37 to close the contact between conductor 45 (now connected to main conductor 39) and conductor 46, the latter leading to solenoid 19. The solenoid 19 is also directly connected to main conductor 38. Thus the movement of the spring switch element 37 causes the solenoid 19 to be energized which moves the gate 17 into open position.

The movement of gate 17 into open position moves the spring switch element 24 so as to connect the branch conductor 47 to conductor 39'. Branch conductor 47 leads to solenoid 27 which is also connected to main conductor 38 by the branch conductor 48. Thus the movement of switch element 24, produced by the opening of the gate 17, results in the energizing of solenoid 27 which closes the gate 23. The opening of gate 17 also causes the switch element 50 to close the contact between conductor 51 and conductor 52, but conductor 51 is connected to main conductor 39 only when the control switch 41 is in the normal position shown in Fig. 5 (when no cans are to be diverted).

The closing of gate 23 causes the switch element 31 to break the contact between conductors 42 and 43 (and thus interrupt the circuit to solenoid 32) and to close the contact between conductors 42 and 49 (and thus maintain the circuit to solenoid 19 closed through branch conductor 46). As a result, the solenoids 19 and 27 continue to be energized as long as the control switch 41 keeps conductor 39' connected with main conductor 39. However, solenoid 32, after being energized for only a brief moment, again becomes inactive even though the control switch 41 continues to be closed.

Thus it will be apparent that moving the main control switch 41 so as to connect conductor 39' with main conductor 39 momentarily prevents the star wheel 40 from rotating and during such moment halts the travel of the can past the star wheel, but during this momentary interval the gate 17 opens and the gate 23 closes, whereupon the star wheel 40 is again made free to rotate and the cans passing the star wheel will be diverted by the closed gate 23 from the conveyor and caused to pass onto the slide 14 through the open gate 17. It would not be possible for a can to pass the star wheel 40 (provided the control switch 41 has been moved to this operating position) before the gates 17 and 23 are placed in proper position for diverting cans down the slide 14. As a result, this can diverting means will function in the manner described and desired regardless of how rapidly the can conveyor may be moving.

When the control switch 41 is returned to the normal position shown in Fig. 5 (thus when it is no longer desired to divert cans down the slide 14), since the gate 17 is in the open position the switch element 50 will be connecting branch conductor 52 with conductor 51 so that current will momentarily pass through branch conductor 52 and conductor 43 to solenoid 32, which will again block the rotation of star wheel 40. However as the gate 17 returns to normal closed position under the force of spring 21, the switch element 50 will be moved to open position thus breaking the contact between conductors 51 and 52 and causing the solenoid 32 to become inactive and enabling the star wheel 40 to be rotated freely. The purpose of this arrangement is to hold up the travel of the cans momentarily while the gate 17 is closing so as to prevent a can being caught by gate 17 while half-way through the passageway controlled by that gate.

The term "can" as used herein and in the claims is to be understood as including any container or other article which might similarly be delivered by a conveyor of the type indicated and which similarly would be required to be diverted at some station along the conveyor.

I claim:

1. In combination with a conveyor for cans and the like having a diverting slide leading off to one side for receiving cans diverted from said conveyor, can-halting means positioned on said conveyor in advance of said slide and arranged to halt the travel of cans on said conveyor whenever said means is operated, a solenoid assembly operating said means whenever activated, a gate located on one side of said conveyor controlling the entrance to said diverting slide, spring means normally holding said gate in closed position, a second solenoid assembly for opening said gate against the force of said spring means when activated, a movable diverting member so located as to extend across said conveyor beyond the entrance to said slide in the direction of travel of said conveyor, spring means normally holding said diverting member out of can-diverting position on said conveyor, a third solenoid assembly for moving said diverting member into can-diverting position when activated, an electric circuit connected to a source of electric energy, a control switch connecting said first solenoid assembly to said circuit when said switch is set in one position, means operated by the activation of said first mentioned solenoid assembly for connecting said second solenoid assembly to said circuit, means operated by the activation of said second solenoid assembly for connecting said third solenoid assembly to said circuit, a holding circuit for said second and said third solenoid assemblies, means operated by the activation of said second solenoid assembly for setting up said holding circuit, means operated by the activation of said third solenoid assembly for disconnecting said first solenoid assembly from said circuit, a branch circuit arranged to be connected to said first solenoid assembly when said control switch is moved to another position, and means operated by said side gate for interrupting said branch circuit when said gate returns to closed position.

2. In combination with a conveyor for cans and the like having a diverting slide leading off to one side for receiving cans diverted from said conveyor, a rotatable star wheel positioned on said conveyor in advance of said slide and arranged to halt the travel of cans on said conveyor whenever said wheel is operatively held against rotation, a solenoid assembly holding said wheel against rotation whenever activated, a gate located on one side of said conveyor controlling the entrance to said diverting slide, a spring normally holding said gate in closed position, a second solenoid assembly for opening said gate against the force of said spring when activated, a diverting gate so located as to extend diagonally across said conveyor beyond the entrance to said slide, a spring normally holding said diverting gate out of can-diverting position on said conveyor, a third solenoid assembly for moving said diverting gate into can-diverting position when activated, an electric circuit connected to a source of electric energy, a control switch connecting said first solenoid assembly to said circuit when said switch is set in one position, means operated by the activation of said first mentioned solenoid assembly for connecting said second solenoid assembly to said circuit, means operated by the opening of said first mentioned gate connecting said third solenoid assembly to said circuit, a holding circuit for said second and said third solenoid assemblies, means operated by the opening of said first mentioned gate for setting up said holding circuit, means operated by the closing of said diverting gate for disconnecting said first solenoid assembly from said first mentioned circuit, a branch circuit adapted to be set up to said first solenoid assembly when said control switch is moved to another position, and means operated by said first mentioned gate for interrupting said latter mentioned branch circuit when said first mentioned gate returns to closed position.

References Cited in the file of this patent
UNITED STATES PATENTS 2,455,741    Dodge _____ Dec. 7, 1948

FOREIGN PATENTS 818,058    France _____ June 7, 1937